United States Patent
Hansen

Patent Number: 5,967,291
Date of Patent: Oct. 19, 1999

[54] METHOD OF TRANSFERRING PRODUCTS SUCH AS ICE LOLLIES

[75] Inventor: Per Henrik Hansen, Hasselager, Denmark

[73] Assignee: Tetra Pak Hoyer A/S, Højbjerg, Denmark

[21] Appl. No.: 08/904,551

[22] Filed: Aug. 4, 1997

[30] Foreign Application Priority Data

Aug. 2, 1996 [DK] Denmark .................... 0827/96

[51] Int. Cl.$^6$ ............................ B65G 47/24
[52] U.S. Cl. ..................... 198/409; 198/468.2
[58] Field of Search ................... 198/409, 432, 198/433, 468.2

[56] References Cited

U.S. PATENT DOCUMENTS

| | | | |
|---|---|---|---|
| 2,944,655 | 7/1960 | Griswold | 198/409 |
| 3,933,236 | 1/1976 | Aterianus et al. | 198/432 |
| 5,147,026 | 9/1992 | Scaglia | 198/409 |

*Primary Examiner*—Joseph E. Valenza
*Attorney, Agent, or Firm*—Sixbey, Friedman, Leedom & Ferguson; David S. Safran

[57] ABSTRACT

In certain production lines such as for some edible ice products it is actual to transfer the products from a hanging position in a feeding row to a lying position on an underlying conveyor, e.g. for conveying to a packaging station, and it is known to effect such a transfer by means of a product gripping pivot arm which grips the product and swings it down through 90° to a position in which the product is released for falling down on the conveyor. There are associated problems with respect to the delivery accuracy, already because of the necessity of accelerating the products to the conveyor speed. With the invention the pivot arm is arranged and controlled in such a manner that the products, when released to the conveyor, are located very closely above the conveyor and are in motion with a velocity component in the conveying direction roughly corresponding the velocity of the conveyor, whereby the delivery accuracy is largely improved. Moreover, products from two or more parallel product rows may be safely transferred to the conveyor in a single line thereon.

10 Claims, 2 Drawing Sheets

METHOD OF TRANSFERRING PRODUCTS SUCH AS ICE LOLLIES

The present invention relates to a method of transferring products such as ice lollies from an advanced row of products, in which the products are seizable for being deposited on a conveyor in a lower level, e.g. on a flow packaging web advanced on the conveyor, the transfer being effected by a pivot arm having at its free end a gripping device which, in a raised position of the pivot arm, grips the product to be transferred, whereafter the pivot arm is swung downwardly for bringing the product to a release position above the conveyor, from which position the released product is caused to be brought down by gravity to the conveyor.

In certain production systems, e.g. for producing edible ice bodies having been dipped in some coating substance, it is actual to currently transfer products from a hanging, vertically oriented position to a horizontally oriented position, e.g. for subsequent packaging in a flow packing system. The hanging products may be advanced in one or more rows to a delivery position, at which the transfer system will serve to grip them and swing them down to a stop and release position, from which they will then, now "lying", be dropped to be deposited on the wrapping web.

The products, right after their falling, will be accelerated up to the conveyor speed by their frictional engagement with the moved web, but it has been found that this may imply that the products are finally deposited in unprecise positions on the web, as upon their landing they may be non-uniformly displaced during their acceleration up to the conveyor speed.

The said falling of the products may also incur the risk of the products being damaged by the impact to which they are subjected by their landing on the packaging web. This risk particularly pertains to fragile products, whereby it is actual for various ice products.

The indicated problems in connection with the prior art are particularly pronounced when the associated conveyor is moved at high speed. A high operational speed of the conyeyor is desirable in order to enable a high production capacity of the entire production plant.

On this background there is a need for enabling a more precise and gentle transfer of the products.

With the present invention is has been recognized that the said problem with respect to uneven acceleration of the products on the underlying conveyor or the packaging web advanced thereon can be remedied by not stopping the pivot arm in its swung down release position, but to the contrary causing and controlling it to be kept in motion in such a manner that the transferred product, when released, will already have a speed component in the horizontal direction substantially corresponding to the velocity of the conveyor or the conveyed packaging web. With such an associated dynamic delivery of the products, these products will practically be swung off with such a velocity that they will not have to undergo any subsequent acceleration, and accordingly the products will be laid down with a relative speed close to zero into stable positions. The pivot arm may well be stopped more or less abruptly once it has released the product.

In connection with the invention is has been found that it is possible and desirable to additionally arrange for the transfer to take place in such a manner that the products are released in positions where they, with a lying orientation, are spaced very shortly from the conveyor surface, such that they are almost touching the packaging web and thus will be subjected to a fall only through a very small height. The geometry of the transfer system is adaptable to the effect that the objects can be brought into such delivery positions in response to the pivot arm being swung down to a release position somewhat before it would reach a position perpendicular to the conveyor. As will be clear from the following this will imply that the vertically oriented products should be gripped at an inclined position of the pivot arm and also that at the moment of release, the products will have a velocity component both forwardly in the moving direction or the conveyor, according to the primary aspect of the invention, but also downwardly towards the conveyor. Thus, the said free fall is converted into an active throwing down, but this is advantageous when associated with a close proximity between the object and the conveyor and with a more or less horizontal position of the product, in addition to the product being delivered to the conveyor with substantially the same moving speed. All this will contribute to a high precision depositing of the products on the packaging web.

As also discussed in the following, a further possibility will be to arrange for such lateral displacements that one transfer system or pivot arm will be able to merge products from two or more product delivery lines to a single packaging line operating at high speed.

In the following the invention is described in more detail with reference to the drawing, in which.

Figure 1:
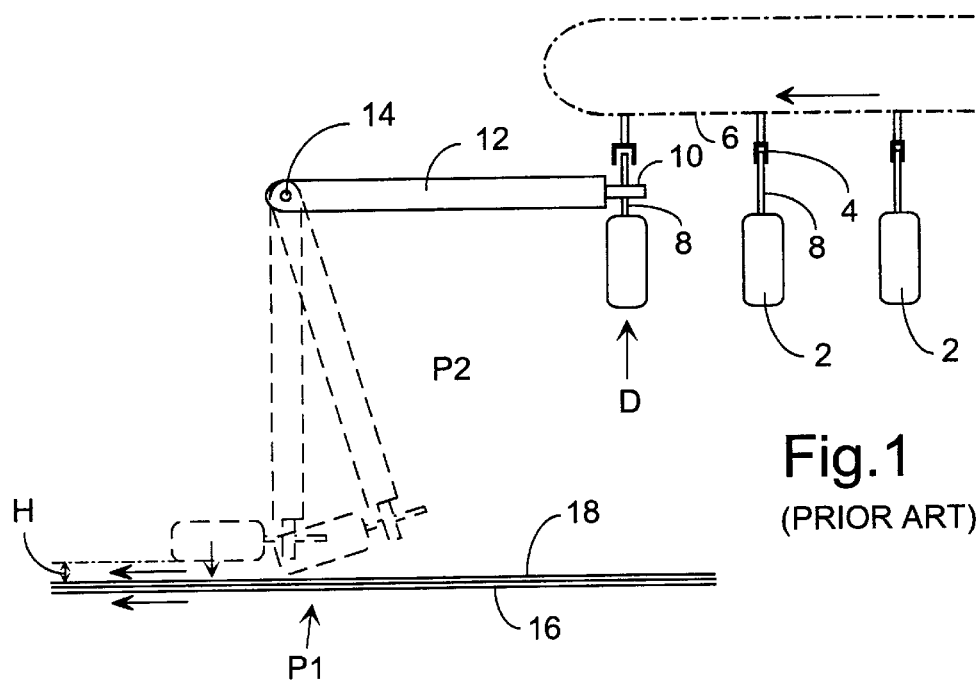
FIG. 1 is a schematic side view of a known transfer system.

In FIG. 1, representing known art, it is shown that a series of products 2 hanging in overhead gripping members 4 of a conveyor 6 are moved to a delivery position D, in which upper product portions 8 beneath the gripping members 4 are gripped by a gripping device 10 on the free end of a pivot arm 12 located so as to receive the products 2 in a position horizontally projecting from a pivot point 14, about which the arm 12 is downwardly pivotable to a vertical position P1, in which the gripped product is now located at a distance H above an underlying conveyor belt 16 carrying a web 18 of a packaging material towards the left.

It will be noted that the pivot arm 12 will pass a position P2 in which the free end of the product 2, located right underneath the pivot point or axis 14, is passing through a curve, to which the conveyor belt 16 is tangential. At this area, however, the product end should not touch the web 18, and this is why the product 2, in position D1, will finally be brought to a release position noticeably spaced above the web 18. In the position D1 the pivot arm is stopped, whereafter the gripping device 10 is caused to release the product, which will then fall down to be deposited on and accelerated by the web 18.

Figure 2:
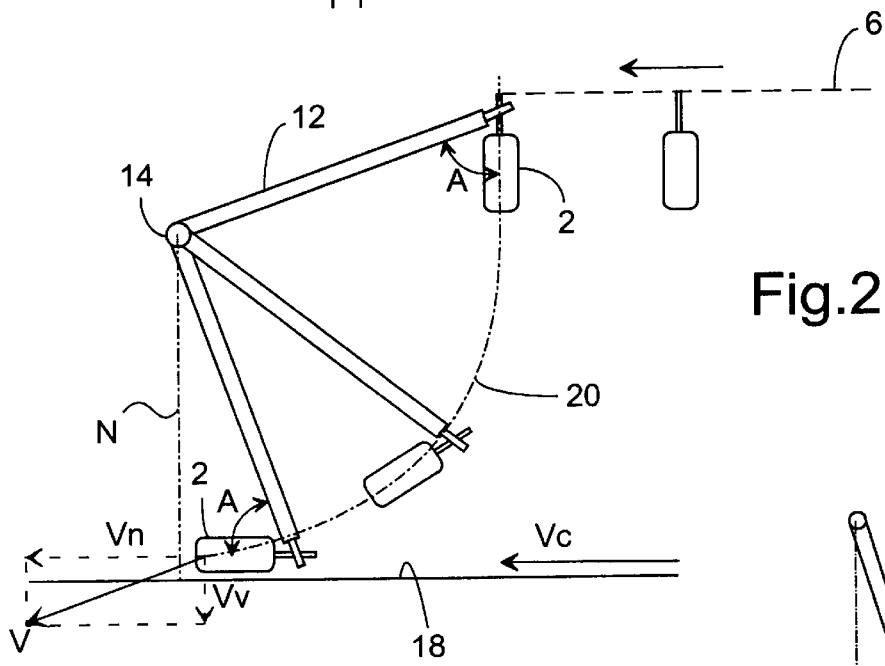
FIG. 2 is a similar view of a transfer system according to the invention.

FIG. 2 is a fully corresponding illustration of a preferred type of geometry according to the invention. The pivot point 14 is located in a lower level relative to the delivery conveyor 6, such that in its raised gripping position the pivot arm 12 will form an acute angle A with the hanging product 2. This mutual positioning will be maintained by the swinging down of the pivot arm, whereby the front end of the product 2 will be moved along the circle segment 20 shown as a dotted line.

The geometry is adapted such that it is the circle segment 20, to which the conveyor/web 16,8 is tangential. This implies that the pivot arm 12 swings the product 2 down to a position, P3, in which the product is located parallel to and almost touching the web 18 as the pivot arm forms the angle A with that web, still moving downwardly towards the web.

This movement has an angular velocity expressed by the vector V, which is shown resolved in a horizontal component $V_h$ and a vertical component $V_v$. In accordance with the invention the pivoting speed of the arm 12 is controlled in such a manner that the component $V_h$ is very close to the linear moving speed $V_c$ of the conveyor/web system 16,18.

Thus, if or when the gripping device 10 is caused to release the product in position P3, the product 2 will be thrown forwardly with almost the same speed as the web 18 and additionally be thrown downwardly with the speed $V_v$. This throwing down, of course, may result in some reflection from the conveyor, but since the product 2 has now been accelerated to more or less the same speed as the web 16, such a reflection is not liable to produce any horizontal displacement of the product. Moreover, the falling height is very small and the product is clove to touching the web all along the length of the product, so in practice a very precise delivery positioning is achievable.

The normal to the conveyor belt 16 through the pivot point or axis 14 is shown as a dot-and-dash line N, and ideally the product 2 should be released in a position in which the front end of the product is located in the normal plane N with the product 2 just touching the web 18, such as ultimately enabled by the invention. It is an associated condition that the pivot arm 12 be stopped immediately after the release of the product, such that this will not swing its outer gripping means directly down into the web 18.

It is realized, however, that in practice the equipment should preferably be usable with different sizes of products, and while it is of course possible to arrange for some adjustability e.g. of the height position of the pivot axis 14 and the length of the pivot arm 12 in order to approach ideal conditions for different products, it is nevertheless advantageous to operate with a system according to the invention even if the conditions are not fully optimal.

Figure 3:
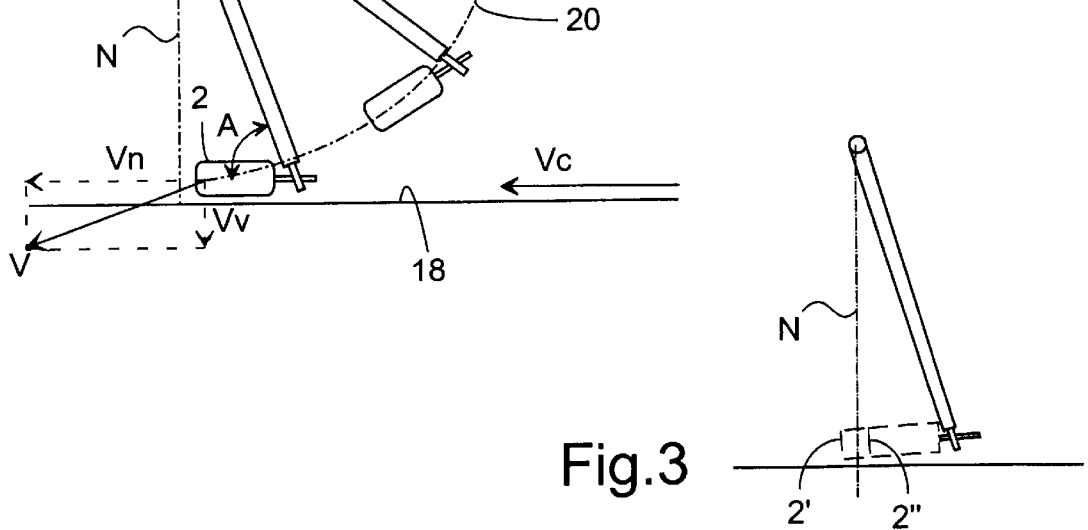
FIG. 3 is another similar view.

Thus, in FIG. 3 it is shown that a relatively long product 2 having a free end 21 may be released in a position with this end located somewhat in front of the normal plane N, implying that the product cannot possibly be released when being in touch with the web 18, because the product should then previously have been dived to underneath the plane of this web. However, despite the resulting small falling height and a slightly inclined product orientation, the advantages of the invention will be achieved anyway, and it will be seen that the delivery conditions will be practically the same if the product is shorter, reaching only to a free end 2". Similar considerations may apply to the products 2 being thicker or thinner.

The products 2 should not necessarily be of the lolly type, i.e. with a protruding carrier member to be gripped by the gripping means of the pivot arm, as the latter means may as well be adapted to grip ice products of both the sandwich type and the cone type, such means already being known in the relevant art.

What is particularly important in connection with the invention is that the products 2 are released from the pivot arm while this arm is still kept in motion, such that the products are delivered dynamically to the underlying conveyor, preferably with the same speed as that of the conveyor, but advantages in delivery precision will be obtained already for delivery speeds of plus or minus 50% of the conveyor speed. Preferably the speed differences should be kept below 10% of the conveyor speed.

Figure 4:
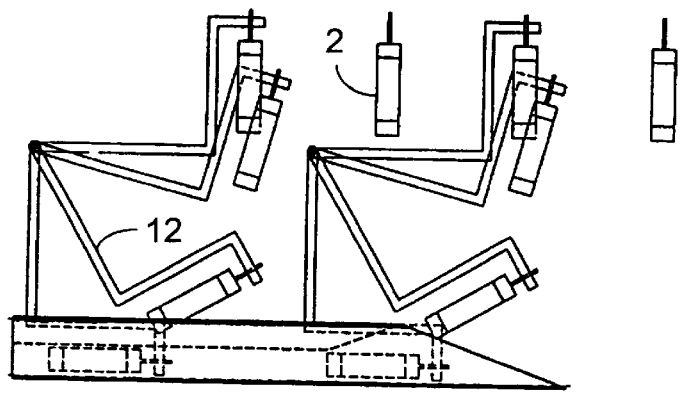
FIG. 4 is a perspective view of a preferred embodiment of the transfer system.

In a practical arrangement according to the invention the pivot arm is designed with an angular configuration as shown in FIG. 4, but this, of course, does not make any change in the principal behaviour of the pivot arm.

FIG. 4 shows that two pivot arms 12 and 12' may be arranged one after the other for ensuring a high capacity without extreme conditions for the operational speed of the pivot arms. In that case the arm 12 should be moved away from its lower position before the next product arrives at this position. In connection with the invention it has been found that in most cases a high transfer accuracy is achievable if only the free end of the product is brought to touch or almost touch the web 18 while the product assumes a rearwardly and upwardly slanting position (as in FIG. 3), and it will be appreciated that the free arm end is then all the better returnable to an elevated position in a fast way. The angle between the product 2 and the conveyor 16,18 may well be some 15–20°, whereby the pivot arm should pivot through only some 70–75°.

Figure 5:
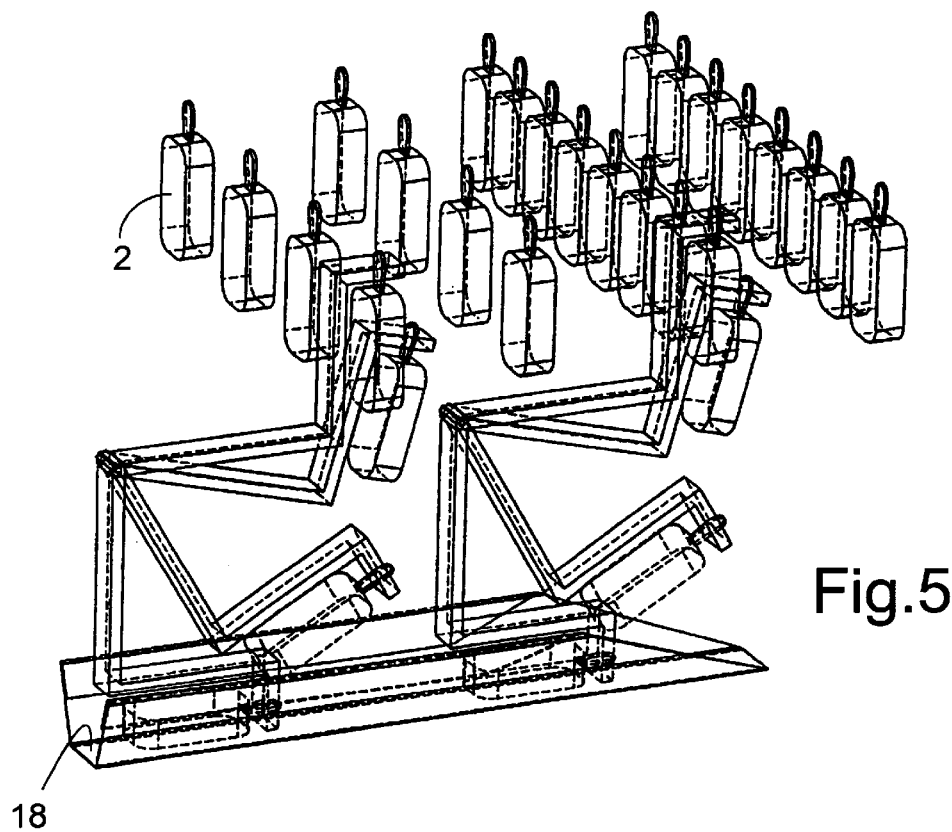
FIG. 5 is a side view thereof.
Figure 6:
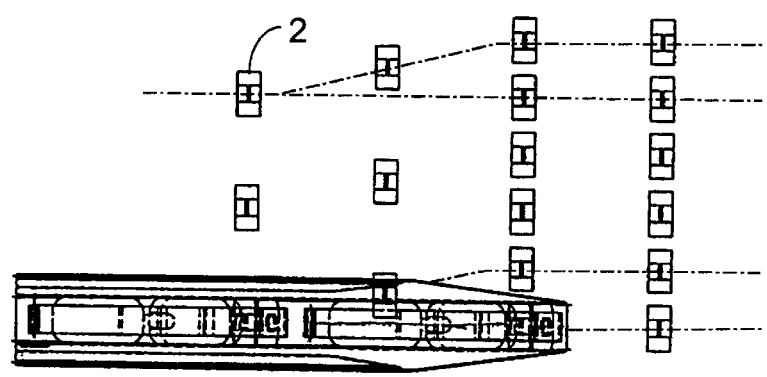
FIG. 6 is a top view thereof.

In FIGS. 5 and 6 it is shown that it is possible to merge the products from two parallel product rows by displacing some of the products laterally before entry into a common transfer station.

Another or further and even preferred possibility is to arrange for the pivot arms to be laterally displaceable for collection of products in product rows that are not aligned with the transfer station. In practice, a number of e.g. 5–10 transfer stations will be co-arranged, with their pivot arms mounted on a common transverse shaft, which is rotated for effecting the desired pivoting of the arms, and this shaft can be arranged so as to be axially shiftable between different positions for the said transverse displacement of the pivot arms.

It will be noted that the disclosed operational conditions for the pivot arms will normally imply that the pivot arms are longer than the free distance from the pivot axis 14 down to the conveyor 16,18. If the products are originally gripped by their lower ends they can still be transferred to the conveyor under the discussed conditions, now only located behind the pivot arm such that the arm cannot be pivoted back again. It may pivot forwardly, i.e. carry out a continuous rotation, but only if it is short enough to pass the plane N above the conveyor. If it is of overlength it could be arranged to be dynamically length adjustable so as to be able to pass anyway.

I claim:

1. A method of transferring products such as edible ice lolly members from an advanced product row, from which the products are siezable, to a conveyor path in a lower level, the transfer being effected by means of a pivot arm having gripping means at its free end operating to grip a product in a swung-up position of the pivot arm and, upon swinging down of the pivot arm, to release the product for delivery thereof to the conveyor path, characterized in that the movement of the pivot arm is controlled in such a manner that the gripping means at the moment of releasing the product have a noticeable component of movement in the longitudinal direction of the conveyor path and a location, at which the product is is located with a pronounced small height above the conveyor path.

2. A method according to claim 1, in which the angular velocity of the pivot arm at the release moment has a component in the direction of the conveyor path of at least 50% of the conveyor velocity, preferably almost the same velocity.

3. A method according to claim 1, by which generally box shaped products are brought down for delivery to the conveyor so as to rest thereon with a flat broad side, characterized in that the movement of the pivot arm is additionally controlled in such a manner that it is brought to grip the product in such a position and with such an angle with the plane of the said broad product side that in the moment of release, where the gripping means advance the product in engagement with the trailing end thereof, the pivot arm assumes such an inclined position that the free front end of the product has been swung downwardly and forwardly to a position in or close to the transverse plane normal to the conveyor path through the pivot axis of the pivot arm.

4. A method according to claim 1, by which the gripping of the products is controlled in such a manner that at the moment of release the products will assume a position substantially parallel with the conveyor path.

5. A method according to claim 1, by which, for swinging down of products advanced in two parallel rows, use is made of two pivot arms located one after the other seen in the advancing direction and operable to deposit products from both of the rows in a single line on the conveyor path, means being used for effecting lateral displacement of the products or the pivot arm of at least one of said product rows preparatory to said single line depositing.

6. A system for transferring products from a hanging position in an advanced row of products to a lying position on a conveyor in a lower level, comprising a pivot arm having means at its free end for gripping the hanging products at their upper end and being pivotable for swinging down a gripped product to a lying position overhead the conveyor, the gripping means being controllable to release the product in this position to enable it to be transferred to the conveyor, characterized in that the pivot axis of the pivot arm is located in a level lower than the level in which the gripping means operate to grip the products and that the length of the pivot arm is equal to or larger than the vertical distance between the pivot axis and the conveyor.

7. A system according to claim 6, in which the gripping means are controlled so as to release the swung-down products dynamically, i.e. during motion of the pivot arm in order to impart to the released product a movement component in the conveying direction of the conveyor.

8. A system according to claim 6, in which the pivot arm cooperates with two or more parallel rows of hanging products, means being provided for laterally displacing the products to enable product delivery in a single line on the conveyor.

9. A system according to claim 6, in which there is arranged two or more pivot arms in positions in line with the conveyor path.

10. A system according to claim 6, in which the pivot arm or several such arms in a plural transfer station is/are arranged so as to be dynamically laterally displaceable for cooperation with more than one feeding row of products.

* * * * *